US011025112B2

United States Patent
Brookes

(10) Patent No.: US 11,025,112 B2
(45) Date of Patent: Jun. 1, 2021

(54) ELECTRICAL MACHINE ROTOR

(71) Applicant: ROLLS-ROYCE PLC, London (GB)

(72) Inventor: David F Brookes, Birmingham (GB)

(73) Assignee: ROLLS-ROYCE plc, London (GB)

( * ) Notice: Subject to any disclaimer, the term of this patent is extended or adjusted under 35 U.S.C. 154(b) by 480 days.

(21) Appl. No.: 16/041,148

(22) Filed: Jul. 20, 2018

(65) Prior Publication Data

US 2019/0074739 A1 Mar. 7, 2019

(30) Foreign Application Priority Data

Sep. 5, 2017 (GB) ..................................... 1714242

(51) Int. Cl.
| | |
|---|---|
| *H02K 1/28* | (2006.01) |
| *H02K 1/27* | (2006.01) |
| *H02K 7/18* | (2006.01) |
| *F01D 15/10* | (2006.01) |
| *H02K 15/03* | (2006.01) |

(52) U.S. Cl.
CPC ............... *H02K 1/28* (2013.01); *H02K 1/278* (2013.01); *H02K 1/2753* (2013.01); *H02K 7/1823* (2013.01); *H02K 15/03* (2013.01); *F01D 15/10* (2013.01); *F05D 2220/32* (2013.01); *H02K 2201/15* (2013.01); *H02K 2205/12* (2013.01); *H02K 2213/03* (2013.01)

(58) Field of Classification Search
CPC ........ H02K 1/28; H02K 1/2753; H02K 1/278; H02K 7/1823; H02K 15/03; H02K 2201/15; H02K 2205/12; H02K 2213/03; F01D 15/10; F05D 2220/32
See application file for complete search history.

(56) References Cited

U.S. PATENT DOCUMENTS

| | | | |
|---|---|---|---|
| 5,744,887 A | 4/1998 | Itoh | |
| 7,557,481 B2 | 7/2009 | Cullen et al. | |
| 8,247,938 B2 * | 8/2012 | Saban | .................... H02K 15/12 310/156.28 |
| 8,878,409 B2 | 11/2014 | Legros et al. | |
| 9,130,437 B1 | 9/2015 | Pulnikov | |
| 2003/0184185 A1 | 10/2003 | Yoshino et al. | |
| 2003/0193258 A1 | 10/2003 | Reiter et al. | |
| 2016/0028283 A1 * | 1/2016 | Chankaya | ................ H02K 3/24 310/54 |
| 2016/0359394 A1 * | 12/2016 | Zheng | .................. H02K 11/012 |

(Continued)

FOREIGN PATENT DOCUMENTS

| | | |
|---|---|---|
| CN | 1126900 A | 7/1996 |
| CN | 103312069 A | 9/2013 |
| DE | 10 2011 089 058 A1 | 6/2013 |

(Continued)

OTHER PUBLICATIONS

English machine translation, Evans (DE 10 2011 089058) (Year: 2013).*

*Primary Examiner* — Burton S Mullins
(74) *Attorney, Agent, or Firm* — Oliff PLC

(57) ABSTRACT

A rotor for an electrical machine is provided. The rotor comprises: a rotor body; one or more magnets arranged around the rotor body; and a non-magnetic containment sleeve positioned radially outwardly of the one or more magnets. The containment sleeve has axially-alternating solid ring sections and reticulated ring sections.

9 Claims, 5 Drawing Sheets

(56) References Cited

U.S. PATENT DOCUMENTS

2018/0233977 A1* 8/2018 Volkmuth ................ H02K 1/16

FOREIGN PATENT DOCUMENTS

| EP | 3068019 A2 | 9/2016 |
| JP | H11-215779 A | 8/1999 |
| JP | 2001-231200 A | 8/2001 |
| JP | 2013-188005 A | 9/2013 |
| WO | 97/18613 A1 | 5/1997 |

* cited by examiner

Detail view 'D'

ELECTRICAL MACHINE ROTOR

FIELD OF THE PRESENT DISCLOSURE

The present disclosure relates to a rotor for an electrical machine.

BACKGROUND

The electrical machine such as a motor or a generator typically has a rotor that contains a plurality of magnets arranged around a rotor body. As the rotor rotates, a radially outward force is exerted on the magnets. Although the magnets are typically bonded to the rotor body, in high temperature and/or high speed applications, a containment sleeve surrounding the magnets is needed to counteract the exerted radially outward force.

The containment sleeve can be made of non-magnetic metal. However, the pulsating magnetic field that results from rotation of the rotor produces eddy currents within the sleeve. These generate heat within the containment sleeve and are thus a source of electrical loss.

Thus in relatively low temperature applications (i.e. <220° C.) carbon fibre composite is sometimes used to form the sleeve. The use of carbon fibre composite eliminates the eddy current losses as it is a non-conductive material. However, composite materials are not typically suitable for high temperature applications as the strength of the resin component reduces dramatically above about 220° C. Even with the use of high temperature epoxy or polyimide, such materials are limited to a maximum operating temperature of about 240° C.

SUMMARY

It would be desirable to provide a rotor that reduces eddy current loss.

Accordingly, in a first aspect, the present disclosure provides a rotor for an electrical machine, the rotor comprising:
  a rotor body;
  one or more magnets arranged around the rotor body; and
  a non-magnetic containment sleeve positioned radially outwardly of the one or more magnets,
  the containment sleeve having axially-alternating solid ring sections and reticulated ring sections.

By segmenting the containment sleeve in the axial direction with the reticulated ring sections, the electrical resistance of the containment sleeve in the axial direction increases, thereby reducing eddy current loss. However, the alternating ring section structure can still provide the sleeve with adequate strength.

In a second aspect, the present disclosure provides a method of producing the containment sleeve according to the first aspect, the method including forming the solid ring sections and the reticulated ring sections alternately in the axial direction by an additive layer manufacturing (ALM) technique.

Advantageously, this technique facilitates the production of reticulated ring sections have relatively complicated reticulation patterns.

The reticulated ring sections can be formed by such a technique without being supported by external supports.

In a third aspect, the present disclosure provides an electrical machine having the rotor according to the first aspect.

In a fourth aspect, the present disclosure provides a gas turbine engine have one or more electrical machines according to the third aspect.

Optional features of the present disclosure will now be set out. These are applicable singly or in any combination with any aspect of the present disclosure.

Each reticulated ring section may be formed by an open framework of intersecting strips. For example, the intersecting strips may extend between neighbouring solid ring sections, the strips being angled from the axial direction. In this case, the strips may be angled from the axial direction by up to 45 degrees. This angling facilitates the production of the reticulated ring sections by an ALM technique because external supports for the strips during ALM may not be needed.

The reticulated ring sections may have an axial length which is about half the axial length of the solid ring sections. This arrangement generally represents a good compromise between enhancing the electrical resistance of the sleeve in the axial direction, while ensuring an adequate containment pressure is applied to the outer surfaces of the magnets by all parts of the containment sleeve.

On a circumferential path around each reticulated ring section at its axial mid-point, the portion of the length of the path occupied by solid material may be no more than 50% of the total length of the path. With such a configuration, the electrical resistance of the containment sleeve in the axial direction may be substantially increased, thereby reducing the eddy current loss.

The rotor may further comprise an outer sleeve radially outwardly of the containment sleeve. The outer sleeve may form a continuous external surface of the rotor. An advantage of providing the outer sleeve is to reduce windage losses caused by the openings of the reticulated ring sections.

The containment sleeve may be made of metal. In this way, the containment sleeve can have the mechanical strength to constrain the magnets under relatively high speed and/or high temperature (e.g. 220° C. or higher).

BRIEF DESCRIPTION OF THE DRAWINGS

Embodiments of the present disclosure will now be described by way of example with reference to the accompanying drawings in which.

DETAILED DESCRIPTION AND FURTHER OPTIONAL FEATURES

Figure 1:
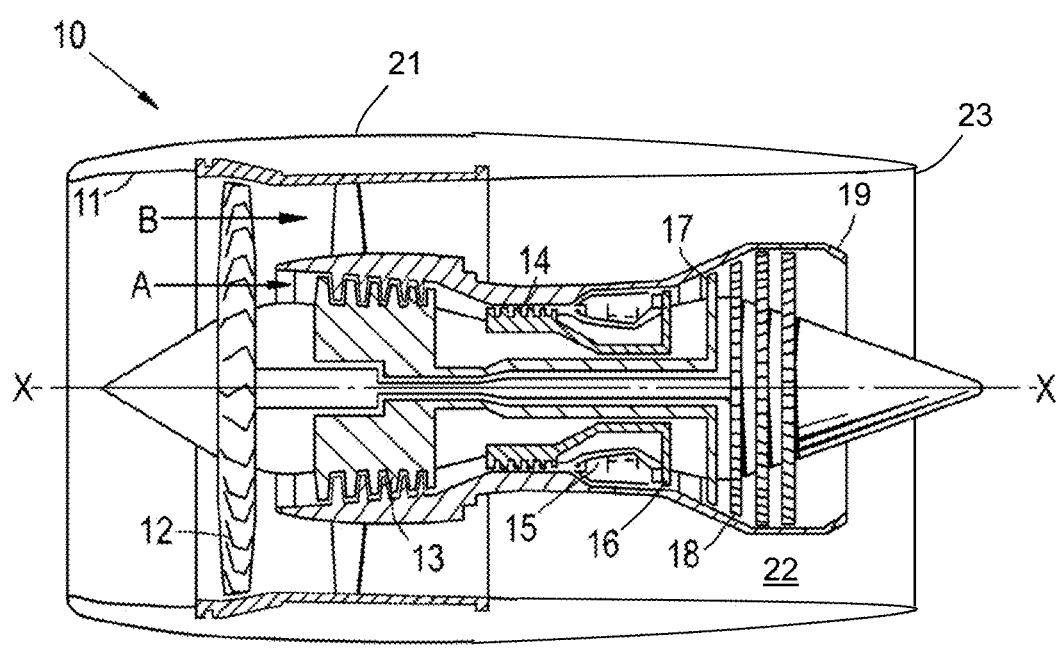
FIG. 1 shows a longitudinal cross-section through a ducted fan gas turbine engine.

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
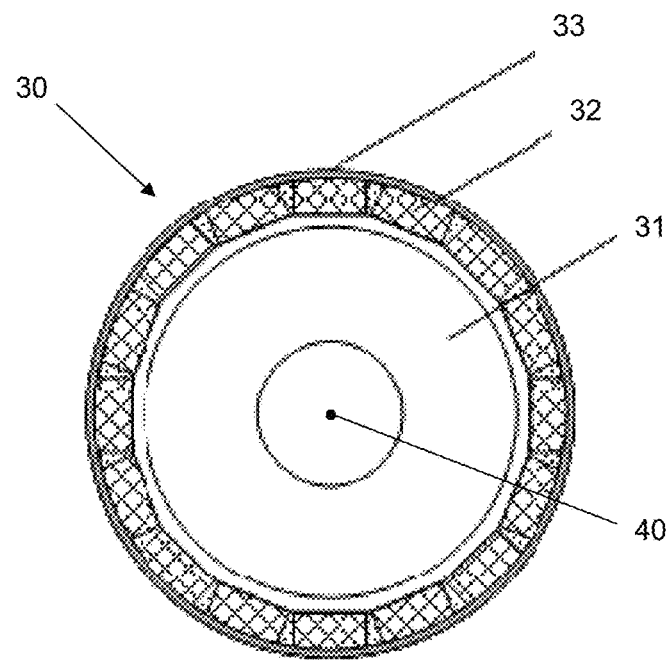
FIG. 2 shows a cross-sectional view of a rotor of an electrical machine of the gas turbine engine of FIG. 1.

The gas turbine engine 10 includes one or more electrical machines, such as a motor coupled to the shafts or a generator to power electrical fuel pumps. The motor or the generator has a rotor and a stator. FIG. 2 shows a cross-sectional view of a rotor 30 of such an electrical machine. The rotor 30 includes a hollow cylindrical rotor body 31, a circumferential row of magnets 32 arranged around the rotor body 31, and a containment sleeve 33 positioned radially outwardly of the magnets 32. The rotor body 31 is coupled to a shaft (not illustrated in FIG. 2) inserted in its central bore. When used as a motor, the rotor body 31 is rotated about its axis 40 by the electro-magnetic excitation of coil windings of an external stator (not illustrated in FIG. 2) to deliver mechanical power to the shaft. When used as a generator, the shaft rotates the rotor body 31 to electro-magnetically excite the coil windings of the stator.

The magnets 32, which typically are permanent magnets, can be fixed to the rotor body 31 by an adhesive which at least partially retains the magnets 32 to the rotor body 31.

To further assure the retention of the magnets 32, the containment sleeve 33 extends around the outside of the rotor body 31 and the magnets 32 to cover the outer surfaces of the magnets. It may be fixed in place by a shrink fitting operation, whereby it applies an inwardly-directed retaining pressure on the magnets 32.

Figure 3:
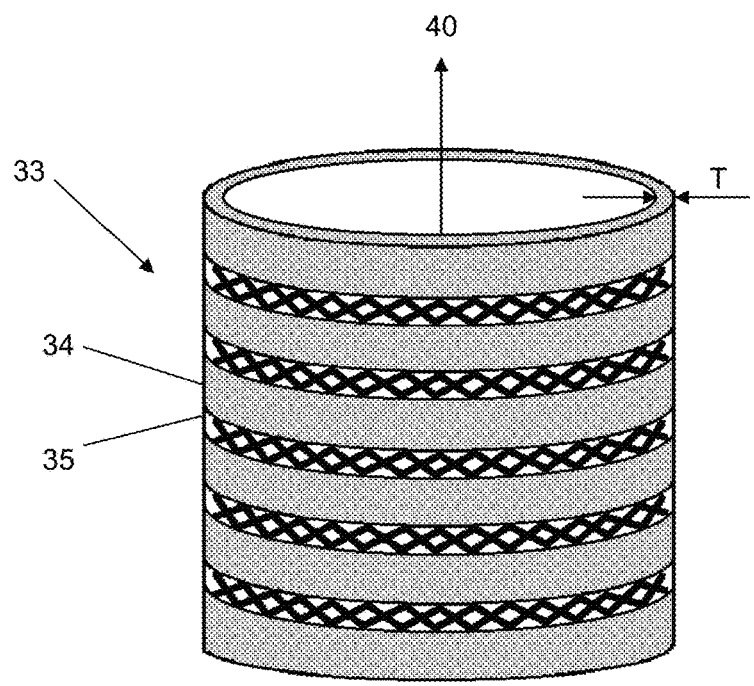
FIG. 3 shows a schematic perspective view of a containment sleeve of the rotor of FIG. 2.

FIG. 3 shows a schematic perspective view of the containment sleeve 33. The sleeve 33 is typically made of non-magnetic metal, such as Inconel™ 718, titanium, or non-magnetic stainless steel, allowing the electrical machine to be operated at high temperatures (e.g. >220° C., which is above the maximum operating temperature of many composite materials).

The containment sleeve 33 is thin to reduce the magnetic gap within the magnetic circuit. In addition, by making the sleeve thin, the electrical resistance of the sleeve is increased thereby reducing eddy currents generated within the sleeve 33. On the other hand, the sleeve 33 needs to be thick enough to maintain adequate mechanical strength to retain the magnets 32, particularly when the surface speed of the rotor is high due to a high rotational speed and/or a large rotor diameter. In typical applications, the thickness T of the sleeve 33 may be about 0.75 mm radially.

The containment sleeve 33 has axially-alternating solid ring sections 34 and reticulated ring sections 35. Conveniently, this structure can be produced by an ALM technique. In such techniques, a component is built up layer by layer until the 3D component is defined. Specific examples of the ALM technique include (without limitation); electron beam melting (EBM), direct laser deposition (DLD), laser engineered net shaping (LNS), selective laser melting (SLM), direct metal laser sintering (DMLS) and selective laser sintering (SLS).

During ALM, the solid ring sections 34 and the reticulated ring sections 35 are alternately formed in the axial direction of the rotor 30. The ALM technique allows complicated reticulated sections 35 to be produced with high degrees of accuracy and as near net shapes, thereby reducing the need for any finish-machining.

Figure 4A:
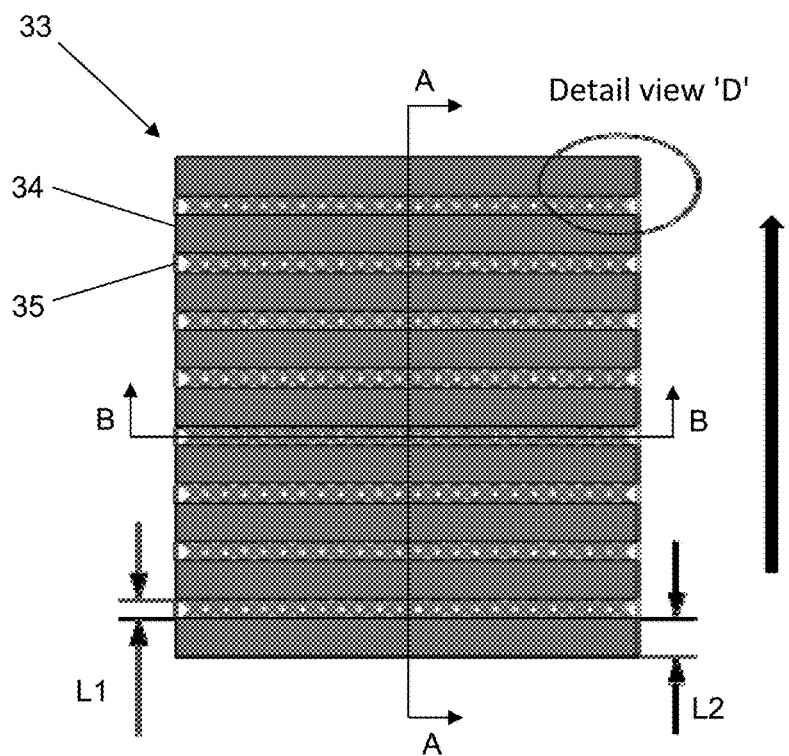
FIG. 4A shows a schematic developed view of the containment sleeve of the FIG. 3.
Figure 4B:
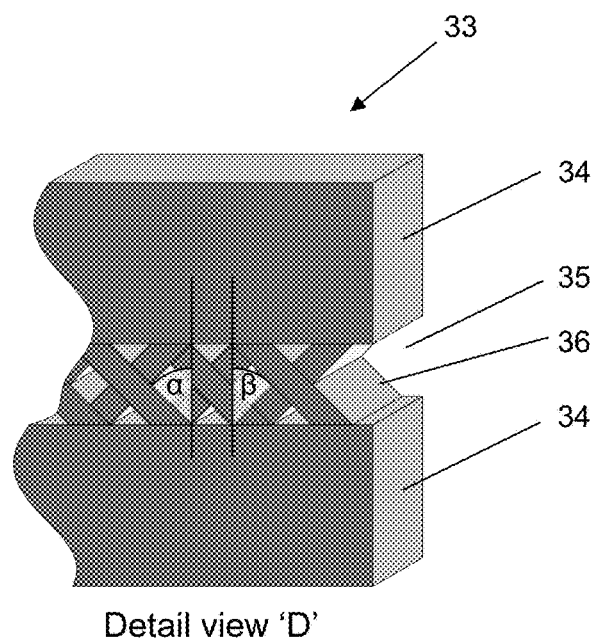
FIG. 4B shows a detailed view of a part D of the containment sleeve in FIG. 4A.

FIG. 4A shows a developed view of the containment sleeve 33, and FIG. 4B shows a detailed view of a part D of the containment sleeve 33 in FIG. 4A. In FIG. 4A, the axial direction is indicated by a thick vertical arrow. Each solid ring section 34 is a solid body having no holes, i.e. it is fully dense. Each reticulated ring section 35, by contrast, can be formed by an open framework of intersecting strips 36. The intersecting strips 36 extend between neighbouring solid ring sections 34. Conveniently, the strips 36 can be arranged to form a regular lattice. The open structure of the reticulated ring sections 35 allows residual non-fused powder from the ALM technique to be easily removed.

As shown in FIG. 4B, each strip 36 is angled by an amount $\alpha$ in one direction from the axial direction, or by an amount $\beta$ in the other direction from the axial direction. The angles $\alpha$ and $\beta$ can be up to 45 degrees. The strips can all be inclined by the same amount (e.g. $\alpha=\beta$), or some strips can be inclined differently to others (e.g. $\alpha\neq\beta$ so that all the strips inclined in one direction are angled differently to all those inclined in the opposite direction). In order to produce the containment sleeve 33 by ALM, adequate support for existing structures must be provided as further layers are added. Advantageously, by angling each strip 36 from the axial direction by no more than 45 degrees, the strips 36 can be self-supporting during ALM. In this way, additional support structures for the strips 36 can be avoided, and post-processing to remove such support structures is not needed.

Figure 4C:
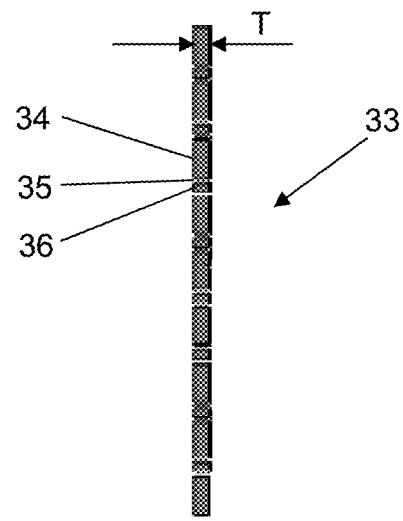
FIG. 4C shows a cross-sectional view of the containment sleeve along the line A-A in FIG. 4A.

FIG. 4C shows a cross-sectional view of the containment sleeve along the line A-A in FIG. 4A. With reference to FIGS. 4A and 4C, each reticulated ring section 35 has an axial length L1 which is about half the axial length L2 of each solid ring section 34. Advantageously, the axial cross-section of the containment sleeve 33 shown in FIG. 4C provides a largely uniform contact surface. With such an arrangement, any differences in the stress applied to the surface of the magnets 32 when the containment sleeve 33 is shrink fitted in place may be reduced while, nonetheless, on other axial cross-sections more substantial gaps to segment the containment sleeve 33 may still be provided.

Figure 4D:
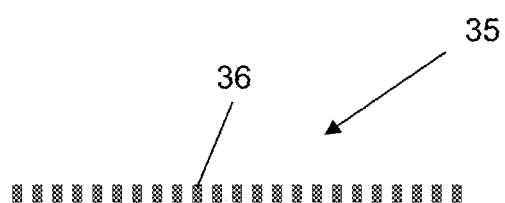
FIG. 4D shows a cross-sectional view of the containment sleeve along the line B-B in FIG. 4A.

In particular, FIG. 4D shows a cross-sectional view of the containment sleeve 33 along the line B-B in FIG. 4A, the line B-B being a circumferential path around one of the reticulated ring sections 35 at its axial mid-point. As shown in FIG. 4D, the portion of the length of the path occupied by the strips 36 (i.e. occupied by solid material) is no more than 50% of the total length of the path. Thus the reticulated ring sections 35 form substantial bottlenecks to conduction in the axial direction by eddy currents generated within the containment sleeve 33. As a result, the electric resistance of the containment sleeve 33 increases in this direction, thereby reducing the eddy currents and the impact of eddy current loss on the performance of the rotor 30.

In summary, the containment sleeve 33 can help to achieve low eddy current loss and good mechanical strength, even at high operating temperatures. Moreover, it can conveniently be produced by ALM.

Figure 5A:
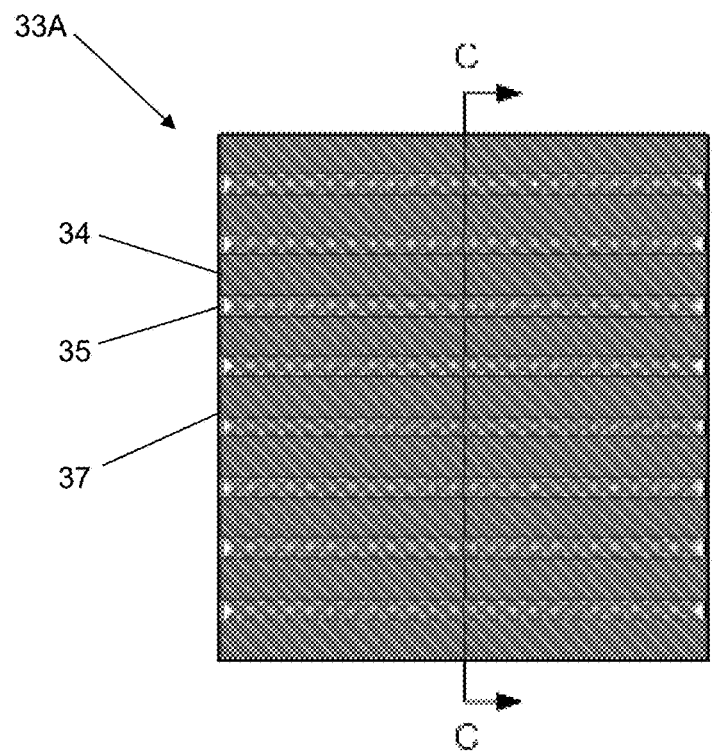
FIG. 5A shows a schematic developed view of a variant of the containment sleeve.
Figure 5B:
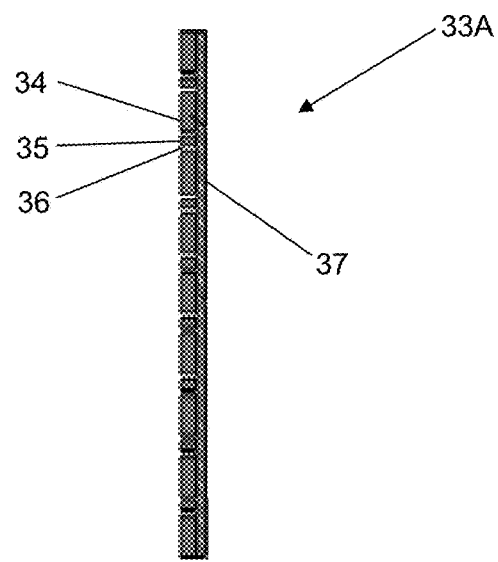
FIG. 5B shows a cross-sectional view of the containment sleeve along the line C-C in FIG. 5A.

FIG. 5A shows a developed view of a variant of the containment sleeve 33A, and FIG. 5B shows an axial cross-sectional view of the containment sleeve 33A along the line C-C in FIG. 5A. In this variant, the rotor includes an outer sleeve 37 positioned radially outwardly of the containment sleeve 33A. The outer sleeve 37 forms a continuous external surface of the rotor.

Without such an outer sleeve 37, the open framework of the reticulated ring sections 35 may cause turbulence in the air gap between the rotor and the stator. By providing the outer sleeve 37, the windage losses caused by this turbulence may be reduced. The outer sleeve 37 may be substantially thinner than the containment sleeve 33 as it is non-structural, and/or it may be made of non-conductive material (e.g. resin) to avoid eddy currents forming therein.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A rotor for an electrical machine, the rotor comprising:
   a rotor body;
   one or more magnets arranged around the rotor body; and
   a non-magnetic containment sleeve positioned radially outwardly of the one or more magnets, wherein:
   the containment sleeve has axially-alternating solid ring sections and reticulated ring sections,
   each reticulated ring section is formed by an open framework of intersecting strips, and
   the intersecting strips extend between neighboring solid ring sections, the strips being angled from the axial direction.

2. The rotor according to claim 1, wherein the strips are angled from the axial direction by up to 45 degrees.

3. The rotor according to claim 1, wherein the reticulated ring sections have an axial length which is about half the axial length of the solid ring sections.

4. The rotor according to claim 1, wherein, on a circumferential path around each reticulated ring section at its axial mid-point, the portion of the length of the path occupied by solid material is no more than 50% of the total length of the path.

5. The rotor according to claim 1, further comprising an outer sleeve radially outwardly of the containment sleeve, the outer sleeve forming a continuous external surface of the rotor.

6. The rotor according to claim 1, wherein the containment sleeve is made of metal.

7. A method of producing the containment sleeve according to claim 1, the method including forming the solid ring sections and the reticulated ring sections alternately in the axial direction by an additive layer manufacturing technique.

8. An electrical machine having the rotor according to claim 1.

9. A gas turbine engine having one or more electrical machines according to claim 8.

* * * * *